United States Patent [19]

Plume

[11] Patent Number: 4,470,068
[45] Date of Patent: Sep. 4, 1984

[54] TELEVISION TRANSMITTER

[75] Inventor: Edward G. Plume, Cambridge, England

[73] Assignee: U.S. Philips Corporation, New York, N.Y.

[21] Appl. No.: 365,758

[22] Filed: Apr. 5, 1982

[30] Foreign Application Priority Data

Apr. 15, 1981 [GB] United Kingdom ............... 8111894

[51] Int. Cl.³ .......................... H03C 1/28; H04B 1/04
[52] U.S. Cl. ..................................... 358/186; 455/109
[58] Field of Search ............... 358/186, 184; 455/108, 455/109

[56] References Cited

U.S. PATENT DOCUMENTS

| | | | |
|---|---|---|---|
| 3,473,125 | 10/1969 | Babillon | 455/108 |
| 3,740,649 | 6/1973 | Itoh | 455/108 |
| 3,955,155 | 5/1976 | Behrend | 455/109 |
| 4,300,237 | 11/1981 | Morgan | 455/109 |

OTHER PUBLICATIONS

New Technique Reduces UHF TV Transmitter Power Consumption, by Anon, RCA Broadcast New, vol. 159, p. 44, Oct. 1976.
20 KW UHF Television Transmitter with all Solid State Driver for Klystron Amplifiers, by Irmer and Muller, Electrical Communication, vol. 48, No. 4, 1973, pp. 436-443.

Primary Examiner—Tommy P. Chin
Attorney, Agent, or Firm—Thomas A. Briody; William J. Streeter; Edward W. Goodman

[57] ABSTRACT

A television transmitter comprises a video processing circuit (2) an amplitude modulator (4) a vestigial sideband filter (8) an R.F. amplifying stage (9) and a klystron amplifier (10) which feeds an antenna (22). The klystron is provided with a grid electrode (12) to which a video signal is applied to modulate the density of the electron beam. The video signal applied to the grid electrode (12) is derived from the output of the video processing circuit (2) and fed via a low-pass filter (6) and a d.c. isolating circuit (20) to an amplifier (21) which provides a signal of the desired amplitude at the grid electrode (12). The filter (6) is arranged to restrict the bandwidth of the video signal applied to the grid electrode (12) to less than that of the vestigial sideband in order to reduce the possibility of re-inserting the higher frequencies into the vestigial sideband. The d.c. isolating circuit isolates the video signal source from the cathode and grid potentials of the klystron which are typically between 10 K and 30 K volts.

12 Claims, 5 Drawing Figures

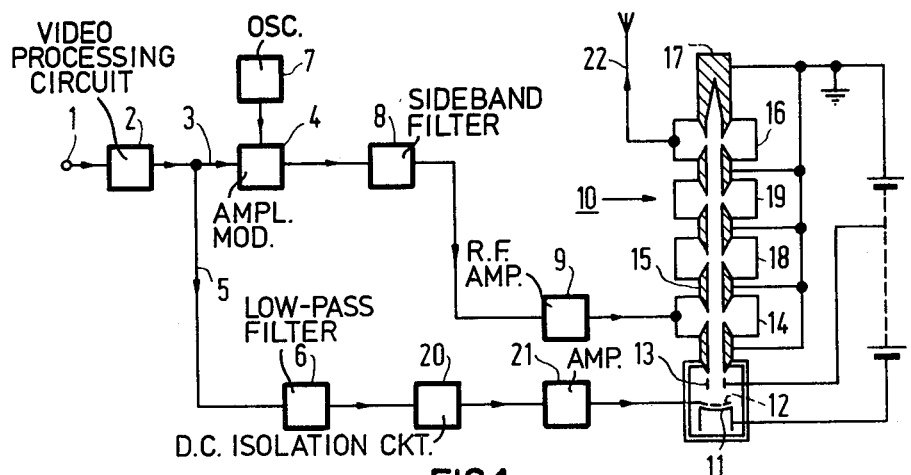
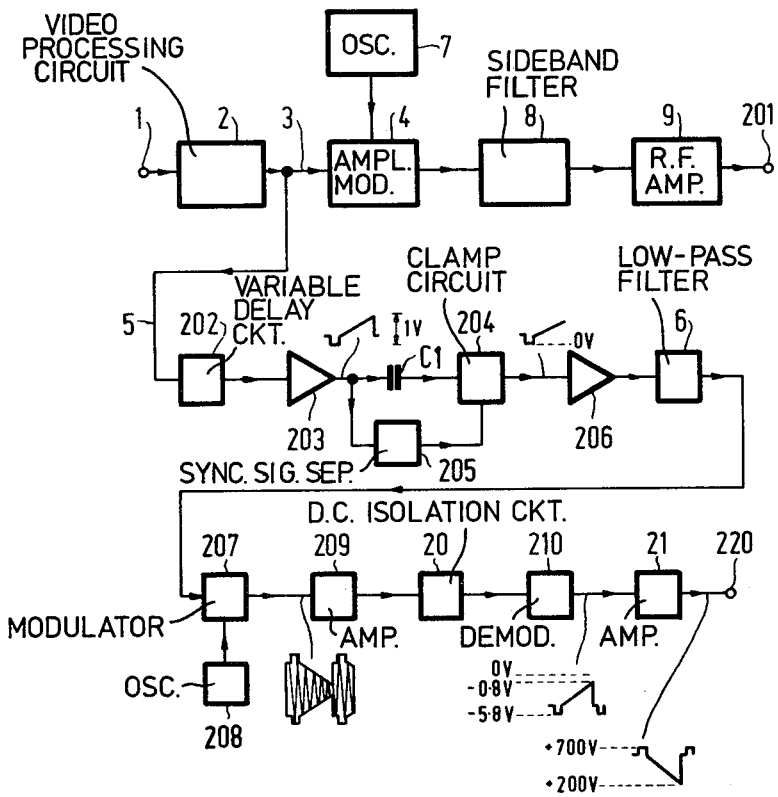
FIG.1
FIG.2

TELEVISION TRANSMITTER

BACKGROUND OF THE INVENTION

The invention relates to a television transmitter for transmitting amplitude modulated signals, the transmitter comprising a kylstron amplifier, means for feeding the amplitude modulated video signal to the input cavity of the klystron, means for coupling the signal from the output cavity of the klystron to an antenna, and means for feeding the unmodulated video signal to a control electrode situated adjacent to the cathode of the klystron.

Such a transmitter is disclosed in U.S. Pat. No. 3,740,649 to Itoh in which it is stated that the efficiency and linearity is improved by the application of the unmodulated video signal to the control electrode.

A broadcast television signal normally comprises a carrier signal, an upper sideband having a bandwidth between 4 and 6 MHz and a lower sideband having a bandwidth between 0.75–1.25 MHz. The lower sideband is referred to as a vestigial sideband. The higher frequencies which are produced in the lower sideband by the modulator may be filtered either before or after application to the klystron amplifier. However, if the filter is situated at the output of the klystron amplifier, it has to be constructed so as to be able to dissipate considerable energy and consequently it is desirable to filter the modulated signal before application to the klystron amplifier. If, however, the video signal is now applied to the control electrode of the klystron the higher frequencies of the lower sideband may be reinserted by modulation of the beam current density.

SUMMARY OF THE INVENTION

It is an object of the invention to provide a television transmitter using a klystron amplifier having a high efficiency suitable for transmitting a signal having one sideband of restricted bandwidth.

The invention provides a television transmitter as described in the opening paragraph characterized in that the amplitude modulated signal fed to the input cavity of the klystron comprises a full sideband and a vestigial sideband, the means for feeding the unmodulated signal to the control electrode includes d.c. isolating means to for isolating the cathode and electrode potential from the video signal source, and that the bandwidth of the unmodulated video signal applied to the control electrode of the klystron is less than or equal to the bandwidth of the vestigial sideband.

The restriction of the bandwidth of the unmodulated video signal applied to the control electrode of the klystron has two advantages. First, the possibility of reinserting the higher frequencies into the vestigial sideband is reduced, and second, the power necessary to drive the control electrode is reduced. It has been found that the bandwidth of the unmodulated video signal applied to the electrode may be further reduced to below 500 KHz, since the major part of the power in the unmodulated video signal is, in practice, contained in the lower frequency components.

DESCRIPTION OF THE DRAWINGS

Embodiments of the invention will now be described, by way of example, with reference to the accompanying drawings, in which:

FIG. 1 shows in block schematic form a television transmitter including a klystron amplifier according to the invention;

FIG. 2 shows in block schematic form a first arrangement for feeding a video signal to the control electrode of a klystron amplifier in the transmitter shown in FIG. 1;

DESCRIPTION OF THE PREFERRED EMBODIMENT

Figure 3:
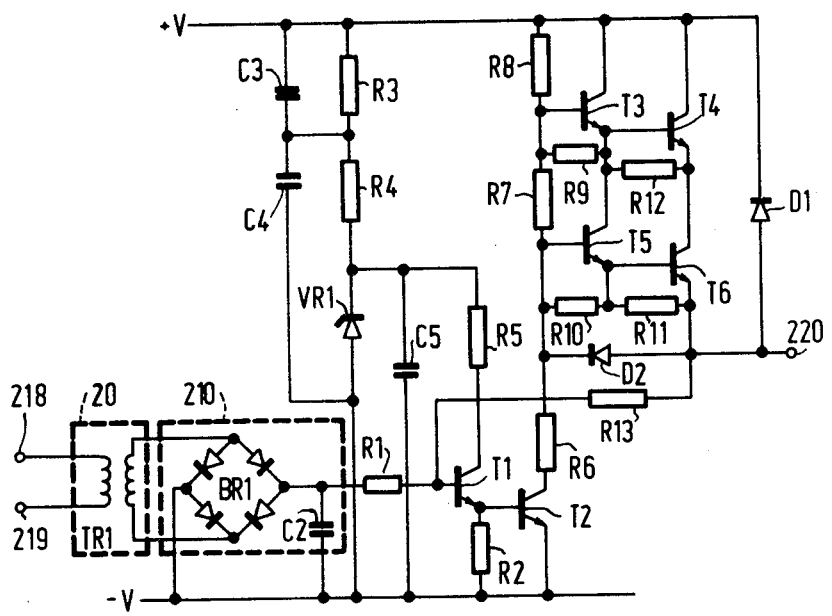
FIG. 3 is a circuit diagram of the video amplifier whose output is connected to the control electrode of the klystron amplifier.

The television transmitter shown in FIG. 1 has an input terminal 1 to which, in operation, a composite video signal is applied. The terminal 1 is coupled to the input of a video processing circuit 2 whose output is connected via a line 3 to a first input of an amplitude modulator 4 and via a line 5 to a low-pass filter 6. The output of a local oscillator 7 is connected to a second input of the amplitude modulator 4. The output signal from the modulator 4 is passed through a filter 8 which has a passband which covers the upper sideband, the carrier, and a portion or vestige of the lower sideband. The filter 8 is normally designated the vestigial sideband filter. The television signal to be transmitted should have a video bandwidth consistent with the television standard concerned for the upper sideband and 0.75 to 1.25 MHz for the lower or vestigial sideband. The output of the filter 8 is then fed to an R.F. amplifying circuit 9 which will include signal linearizing and correcting circuitry both for amplitude and phase or delay, including that caused by the variation in the gain of the klystron as the beam current is varied, and frequency conversion circuitry to arrange the modulated signal into the desired transmission channel.

The main power amplification takes place in a klystron amplifier 10. The klystron 10 comprises an indirectly heated cathode 11, a control electrode 12 which may be in the form of a grid, as shown, or may be an annular electrode, an anode 13, an input cavity 14, a drift tube 15, an output cavity 16, a collector 17, and two intermediate cavities 18 and 19. The drift tube 15 and collector 17 are held at earth ground or near ground potential, while a high negative voltage, normally between 10K and 30K Volts, is applied to the cathode 11. The anode 13 is maintained at a potential between that of ground and that of the cathode 11 in order to determine the basic operating conditions of the klystron 10.

The output of the low-pass filter 6 is fed via a d.c. isolating circuit 20 to an amplifier 21 whose output is connected to the control electrode 12 of the klystron 10. The filter 6 restricts the bandwidth of the video signal fed to control electrode 12 to not greater than that of the vestigial sideband. The d.c. isolating circuit 20 is included to isolate the control electrode 12, which is at a potential close to that of the cathode 11, from the rest of the transmitter circuitry.

The modulated and shaped video signal, available at the output of the R.F. amplifier 9, is coupled to the input cavity 14 of the klystron 10 while the amplified signal is fed from the output cavity 16 of the klystron 10 to an antenna 22.

When the control electrode 12 is in the form of a control grid, the voltage excursion produced by the amplifier 21 may typically be from +200 volts to +700 volts with respect to the cathode 11 potential and the grid 12 is located, with respect to the cathode, at the position where with the grid 12 at a potential of +700 volts, the klystron 10 would behave as if no grid was present. Consequently, during the synchronizing pulses when the potential on the grid 12 is +700 volts, the grid 12 becomes effectively transparent and the beam current is that which would be present in the absence of the grid 12. At lower potentials, with respect to the cathode 11, the beam current will be reduced.

When the control electrode 12 is of annular form, the voltage excursion produced by the amplifier 21 may typically be from 0 V to −1000 V with respect to the cathode 11 potential, the control electrode 12 becoming effectively transparent when the potential is 0 V and hence the beam current becoming that which would be present in the absence of the control electrode 12.

Restriction of the bandwidth of the signal applied to the control electrode 12 to that of the vestigial sideband or less has two advantages. The first is that the possibility of reinserting the upper frequencies into the vestigial sideband due to the density modulation of the beam current is avoided and second, the power required to drive the control electrode 12 due to the electrode-cathode capacitance is reduced. It has been found that the bandwidth of the signal applied to the control electrode 12 may be further restricted to below 500 KHz and still give a satisfactory performance since the major part of the power in the signal is concentrated in the lower frequency range. Thus acceptable efficiency in the klystron amplifier can still be achieved while the problems involved in applying the signal to the control electrode 12 are further reduced.

The embodiment described thus far has the disadvantage that there is a double modulation of the low frequency components of the video signal in the klystron 10. This causes a distortion in the output signal in which the low frequency components and synchronizing pulses are increased in amplitude relative to the high frequency components. To reduce this effect, a high-pass filter, having a characteristic complementary to that of the low-pass filter 6, may be inserted in the line 3. The high-pass filter will substantially reduce the low frequency content of the signal applied to the modulator 4 and hence the double modulation.

An alternative solution to the double modulation problem is to connect a first input of a subtractor to the line 5, a second input of the subtractor to the output of the low-pass filter 6, and the output of the subtractor to the input of the modulator 4 in place of the line 3. This has the advantage over the first solution in that it is not necessary to match the characteristics of two filters since the frequency selection is performed by the same filter in each case.

In the arrangement shown in FIG. 2 those blocks having the same function as those shown in FIG. 1 have been given the same reference numerals. The input terminal 1 is fed with the composite video signal which is fed to the video processing circuit 2. The output of the video processing circuit 2 is fed via a line 3 to the modulator 4, vestigial sideband filter 8 and R.F. amplifying circuit 9 which form a conventional portion of a transmitter, the output of the R.F. amplifying circuit 9 being fed to a terminal 201 which is coupled to the input cavity of the klystron 10.

The output of the video processing circuit 2 is also fed via a line 5 to a variable delay circuit 202 which is adjustable to enable the signal applied to the electrode 12 of the klystron 10 to be synchronized with that applied to the input cavity 14. From the delay circuit 202 the signal is fed via a buffer amplifier 203 and a capacitor C1, to a clamp circuit 204. The output of the amplifier 203 is also fed via a synchronizing signal separator 205 to the clamp circuit 204. By means of this arrangement, the tips of the synchronizing pulses are clamped to a predetermined level which may be 0 volts. The output of the clamp circuit 204 is fed through a buffer amplifier 206 to the low-pass filter 6. The restricted bandwidth video signal from the output of the low-pass filter 6 is fed to a first input of a modulator 207 whose second input is fed from a carrier frequency oscillator 208. The modulated video signal produced at the output of the modulator 207 is fed via a buffer amplifier 209 to the d.c. isolating circuit 20. The d.c. isolating circuit 20 may comprise a transformer having the desired voltage rating i.e. up to 30K Volts, between its primary and secondary windings and from the primary and secondary windings to its core and case. The output from the d.c. isolating circuit 20 is fed to a demodulator 210 and the demodulated signal is fed to the control electrode 12 of the klystron 10 via the amplifier 21. The gain of amplifier 203 is adjustable to set the amplitude of the video signal to 1 volt peak-to-peak and the clamping circuit 204 then sets the peak value of the synchronizing signal at 0 volts. The gain of the modulator 207 may be adjusted so that the voltage of the demodulated signal at the input to the amplifier 21 varies between −0.8 volts and −5.8 volts as shown by the waveform in FIG. 2.

The modulation and demodulation stages 207, 210 shown in FIG. 2 could be omitted with the filtered video signal being fed through the transformer forming the d.c. isolating stage 20 to the amplifier 21. However, this would have the disadvantage of requiring a more expensive transformer due to the lower frequencies which would have to be coupled through the transformer.

When the control electrode 12 is in the form of a grid electrode the amplifier 21, which feeds the video signal to the control electrode 12 of the klystron 10, has to supply a voltage which may vary between 200 and 700 volts. FIG. 3 is a circuit diagram of an amplifier suitable for this purpose.

In addition to the amplifier 21, FIG. 3 also shows the d.c. isolating circuit 20 in the form of a transformer TR1 and the demodulator 210. The modulated video signal is applied to the primary of transformer TR1 via two input terminals 218 and 219 and the transformer secondary winding is connected to the demodulator 210. The demodulator 210 comprises a bridge rectifier BR1 and a capacitor C2. The voltage on the capacitor C2 is applied via a resistor R1 to the base of an npn transistor T1. The emitter of transistor T1 is connected to the base of an npn transistor T2 and via a resistor R2 to the negative supply rail −V. The series arrangement of two resistors R3 and R4 and a voltage reference diode VR1 is connected between the positive supply rail +V and the negative supply rail. The series arrangement of two capacitors C3 and C4 is connected between the positive and negative supply rails with the junction of the capacitors C3, C4 being connected to the junction of resistors R3 and R4. The junction of resistor R4 and the voltage reference diode VR1 is connected via a resistor R5 to the collector of transistor T1. The emitter of transistor T2 is connected to the negative supply rail $-V$ while its collector is connected to the positive supply rail $+V$ via the series arrangement of three resistors R6, R7 and R8.

The junction of resistors R7 and R8 is connected to the base of an npn transistor T3 whose collector is connected to the positive supply rail $+V$. The emitter of transistor T3 is connected to the base of an npn transistor T4, to the collector of an npn transistor T5, and via a resistor R9 to its own base. The base of transistor T5 is connected to the junction of resistors R6 and R7 and via a resistor R10 to its own emitter, which, in turn, is connected to the base of an npn transistor T6 and to one end of a resistor R11, the other end of which is connected to the emitter of transistor T6. The collector of transistor T4 is connected to the positive supply rail $+V$ while its emitter is connected to the collector of transistor T6 and, via a resistor R12, to the emitter of transistor T3. The emitter of transistor T6 is connected to a terminal 220 which forms the amplifier ouput and which is connected to the control electrode 12 of the klystron 10. A first diode D1 is connected between the output terminal 220 and the positive supply rail $+V$ while a second diode D2 is connected between the output terminal 220 and the junction of resistors R6 and R7. A resistor R13 is connected between the emitter of transistor T6 and the base of transistor T1.

The demodulated signal is produced across capacitor C2 and is of the form shown in FIG. 2 at the output of the demodulator 210. The supply voltage between the positive and negative supply rails $+V$, $-V$ is 800 volts and the negative supply rail $-V$ is connected to the cathode potential of the klystron 10, that is $-30$ K Volts. The output voltage at terminal 220 varies between $+200$ volts and $+700$ volts with respect to the cathode potential of the klystron 10. Transistors T3 and T6 form a high voltage emitter follower stage. The potential divider formed by resistors R7 and R8 is connected so that the maximum voltage across any one of these transistors is limited to 400 volts. The emitter follower stage is fed from transistor T2 which is in turn driven by transistor T1. Negative feedback from the output of the amplifier to the base of transistor T1 is provided via resistor R13 and the gain of the amplifier is substantially equal to R13/R1. The diodes D1 and D2 are included to protect the amplifier from the effects of voltage flashovers in the klystron 10. Diode D1 prevents the voltage at terminal 220 from becoming more positive than $+V$ (800V) and diode D2 prevents reverse biassing of the transistors T3 to T6.

In a practical embodiment the components used were as follows.

R1: 2.2KΩ
R2: 12Ω
R3: 7.5KΩ
R4: 7.5KΩ
R5: 150Ω
R6: 1KΩ
R7: 10KΩ
R8: 10KΩ
R9: 2.7KΩ
R10: 2.7KΩ
R11: 2.7KΩ
R12: 2.7KΩ
R13: 8×27KΩ
T1: BC 547
T2: BU 108
T3: BU 108
T4: BUY 89
T5: BU 108
T6: BUY 89
C2: 339pF
C3: 100μF
C4: 100μF
C5: 10μF
BR1: 4×OA91
VR1: 12 V
D1: BYV30
D2: BYV30

When the control electrode, 12 is in the form of a ring electrode a similar amplifier may be used having its positive supply rail connected to the cathode potential and with the addition of a load resistor connected between terminal 220 and the negative supply rail.

Figure 4:
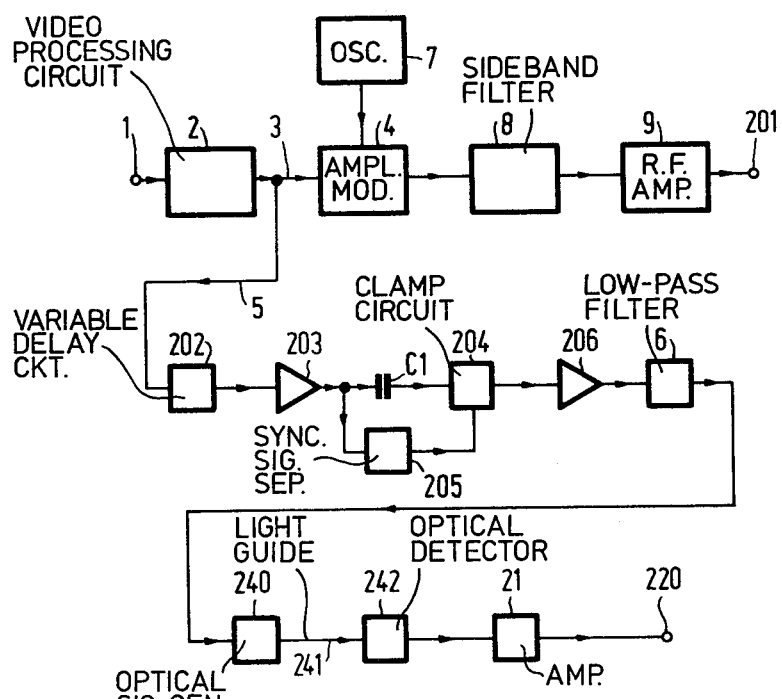
FIG. 4 shows in block schematic form a second arrangement for feeding a video signal to the control electrode of a klystron amplifier in the transmitter shown in FIG. 1.

FIG. 4 illustrates an alternative method of applying the restricted bandwidth video signal to the control electrode 12 of the klystron 10. The arrangement shown in FIG. 4 is identical to that shown in FIG. 2 until the output of the low-pass filter 6. However, in this case instead of being fed to the modulator 207, the output from the low-pass filter 6 is fed to a generator of optical signals 240, such as a light emitting diode or a laser. The optical signal generator 240 takes the video signal from the output of the low-pass filter 6 and converts it into an optical signal which is passed through a glass fiber light guide 241 and which is detected by an optical detector 242. The optical detector 242 converts the received optical signal into an electrical signal and applies this signal to the amplifying circuit 21. The optical detector 242 and amplifier 21 are at the potential of the cathode of the klystron 10, i.e. between $-10$ and $-30K$ volts, and are d.c. isolated from the rest of the transmitter by the optical fiber light guide 241.

Figure 5:
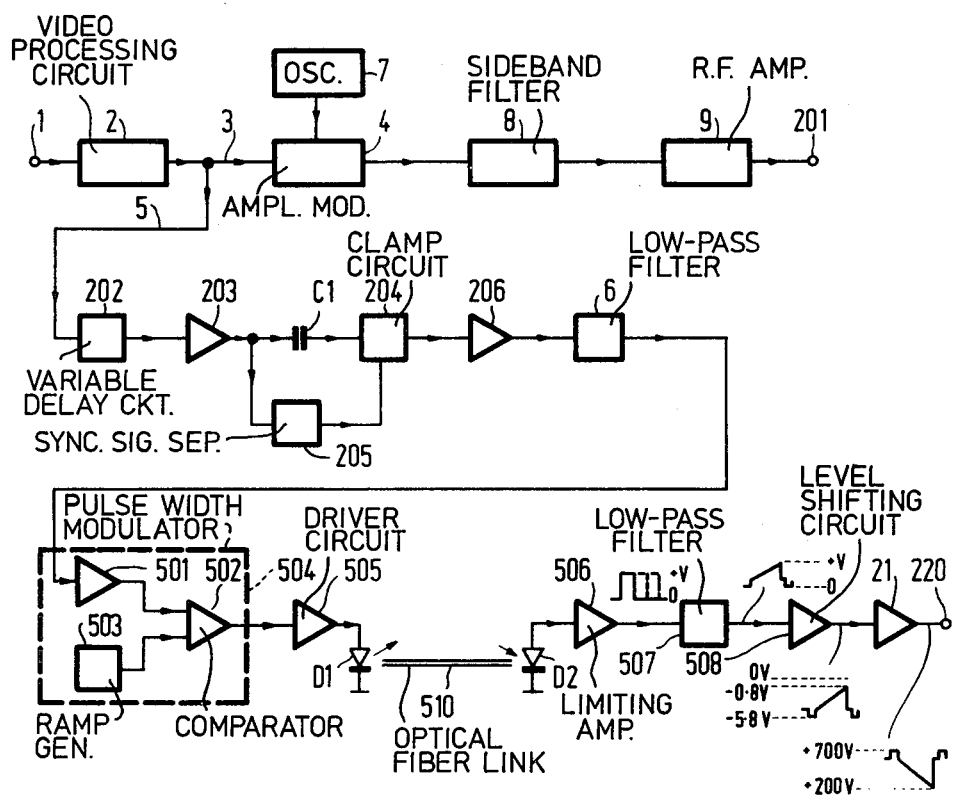
FIG. 5 shows in block schematic form a third arrangement for feeding a video signal to the control electrode of a klystron amplifier in the transmitter shown in FIG. 1.

FIG. 5 illustrates a further alternative method of applying the restricted bandwidth video signal to the control electrode 12 of the klystron 10. The arrangement shown in FIG. 5 is identical to that shown in FIG. 4 until the output of the low-pass filter 6 which defines the bandwidth of the signal to be applied to the control electrode 12 of the klystron 10. As shown in FIG. 5, the output of the filter 6 is fed via an amplifier 501 to a first input of a comparator 502 while the output of a ramp generator 503 is applied to a second input of the comparator 502. The output of comparator 502 comprises a pulse whose width is determined by the period during which the output of amplifier 501 is greater than that of the ramp generator 503. The amplifier 501, comparator 502 and ramp generator 503 form a pulse width modulator 504 whose output is fed via a driver circuit 505 to a light emitting diode D1. The frequency of the output of the ramp generator 503 must be at least twice the bandwidth of the signal to be applied to the control electrode 12 of the klystron 10 and may conveniently be of the order of 1MHz.

The light emitting diode D1 emits pulses of radiation, which may be in the infra-red or visible regions of the spectrum, in respone to the current pulses passed through it by the driver circuit 505. The emitted radiation pulses are passed along an optical fiber link 510 to a photo-detector D2 which is connected to the input of a limiting amplifier 506. The limiting amplifier 506 regenerates the pulse waveform which was degraded in the transmission along the optical fiber link 510. The pulses at the output of the limiting amplifier 506 are fed to a low-pass filter 507 which produces a demodulated video signal at its output. As can be seen from the waveforms shown in FIG. 5, the output of the low-pass filter 507 varies between 0 volts and +V volts where these two potentials are the supply potentials to the limiting amplifier 506. In order to convert this signal into that required at the input of amplifier 21, a level shifting circuit 508 is included between the output of the filter 507 and the input of amplifier 21. The cut-off frequency of the low-pass filter 507 may conveniently be 500 KHz which is well below the 1MHz sampling frequency but allows sufficient bandwidth for some variation of the bandwidth of the video signal. The actual video signal bandwidth is mainly determined by the cut-off frequency of the low-pass filter 6.

The fiber optic link 510 provides electrical isolation between the video signal source and the cathode and control electrode potential of the klystron 10. By pulse width modulating the video signal before applying it to the light emitting diode D1, the linearity of the diode characteristic becomes less important and relatively inexpensive optical fiber may be used for the transmission link.

It would be possible to omit the filter 6 and rely on the filter 507 to restrict the bandwidth of the video signal applied to the control electrode 12 of the klystron 10. However, it is generally more convenient to include the filter 6 as the video signal to be pulse width modulated will then have a narrower bandwidth.

Various other methods of coupling the restricted bandwidth video signal to the control electrode 12 of the klystron 10 are possible. These methods include suitably constructed opto-couplers, high voltage blocking capacitors, a transformer through which an unmodulated video signal is passed, and the radiation of a modulated carrier via suitable transmit and receive antennae.

I claim:

1. A television signal transmitter for transmitting amplitude modulated video signals, the transmitter comprising a klystron amplifier, means for amplitude modulating an unmodulated video signal, means for feeding the amplitude modulated video signal to an input cavity of the klystron, means for coupling the signal in an output cavity of the klystron to an antenna, and means for feeding the unmodulated video signal to a control electrode situated adjacent to a cathode of the klystron, characterized in that the amplitude modulated video signal fed to the input cavity of the klystron comprises a full sideband and a vestigial sideband, the means for feeding the unmodulated video signal to the control electrode includes d.c. isolating means to isolate potentials on the cathode and control electrode from a source of the video signal and that the bandwidth of the unmodulated video signal applied to the control electrode of the klystron is less than or equal to the bandwidth of the vestigial sideband.

2. A television transmitter as claimed in claim 1, wherein said means for feeding the unmodulated video signal includes a low-pass filter which determines the bandwidth of the unmodulated video signal as fed to the control electrode, and wherein the unmodulated video signal is fed to the modulating means via a path having a characteristic complementary to the low-pass filter, for removing the low frequency component of the unmodulated video signal to be amplitude modulated and applied to the input cavity of the klystron.

3. A television transmitter as claimed in claim 1 or 2, in which the bandwidth of the unmodulated video signal as fed to the control electrode of the klystron is less than 500 kHz.

4. A television transmitter as claimed in claim 1 or 2, in which the means for feeding the unmodulated video signal to the control electrode of the klystron includes a signal delay element.

5. A television transmitter as claimed in claim 1 or 2, in which the d.c. isolating means comprises a transformer.

6. A television transmitter as claimed in claim 5, in which the means for feeding the unmodulated video signal to the control electrode of the klystron comprises in cascade a low-pass filter, a modulator, a transformer, a demodulator and an amplifier.

7. A television transmitter as claimed in claim 1 or 2 in which the d.c. isolating means comprises an optical fiber link.

8. A television transmitter as claimed in claim 7, wherein said means for feeding the unmodulated video signal further comprises a pulse width modulator for modulating the unmodulated video signal, means for transmitting the pulse width modulated video signal along said optical fiber link, means for demodulating the pulse width modulated video signal and means for applying the demodulated video signal to the control electrode of the klystron.

9. A television transmitter as claimed in claim 8, in which the unmodulated video signal is passed through said low-pass filter before being applied to the pulse width modulator.

10. A television transmitter as claimed in claim 1, in which the control electrode is located between the cathode and an anode of the klystron and the value of the unmodulated video signal applied to the control electrode during synchronizing pulses is such that a resultant beam current is substantially equal to that which would exist in the absence of a control electrode.

11. A television transmitter as claimed in claim 4, in which the d.c. isolating means comprises a transformer.

12. A television transmitter as claimed in claim 4, in which the d.c. isolating means comprises an optical fiber link.

* * * * *

UNITED STATES PATENT AND TRADEMARK OFFICE
CERTIFICATE OF CORRECTION

PATENT NO. : 4,470,068
DATED : Sept. 4, 1984
INVENTOR(S) : EDWARD G. PLUME

It is certified that error appears in the above-identified patent and that said Letters Patent is hereby corrected as shown below:

On the title page the Foreign Application Priority data should additionally include:

--Mar. 10, 1982 [GB]  United Kingdom  8207017--

Signed and Sealed this

Twenty-third Day of April 1985

[SEAL]

Attest:

DONALD J. QUIGG

Attesting Officer    Acting Commissioner of Patents and Trademarks